United States Patent Office 3,166,429
Patented Jan. 19, 1965

---

3,166,429
PIGMENTED COATING COMPOSITIONS CONTAINING PYRROLIDONE COMPOUNDS
Emil A. Wich, Plainfield, N.J., assignor to General Aniline & Film Corporation, New York, N.Y., a corporation of Delaware
No Drawing. Filed Apr. 22, 1958, Ser. No. 730,068
8 Claims. (Cl. 106—176)

This invention relates to pigment pastes suitable for incorporation in liquid coating compositions which yield protective and/or decorative coatings on solid surfaces; to a process for preparing such pigment pastes, and to colored coating compositions containing them.

Hitherto it was customary, in incorporating dry pigments—organic or inorganic—in paints, lacquers, lithographic inks and other liquid coating compositions, used for protective or decorative purposes, to grind the pigment with the coating composition (or with one or more liquid components thereof) in a ball mill or on a "three-roller" mill. Such pretreatment was considered essential to insure thorough dispersion of the pigment, to avoid grains or specks in coatings produced therewith and to attain full color strength of the pigment.

Grinding operations of the aforesaid nature are expensive and time consuming, and it is an object of this invention to provide pigment paste which, when incorporated directly (e.g., by stirring) in coating compositions of the kind above-mentioned, undergo thorough dispersion, yielding full color strength and avoiding separation of grains or specks, without resorting to wet-grinding operations of the type hitherto employed as noted above. It is also an object of the invention to provide a process for preparing such pastes, and coating compositions containing them.

Pigments suitable for use in preparing the pastes of this invention are dry, finely divided organic or inorganic pigments, as employed hitherto in the preparation of paints, lacquers and similar coating compositions. They are available normally in finely divided form, obtained, for example, by precipitation from solution, pulping, acid pasting, and finally grinding in dry form. Dry powdered pigments thus obtained are in a substantially uniform fine state of subdivision.

In accordance with this invention, the dry powdered pigment is mixed with a pyrrolidone compound having the formula:

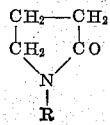

wherein "R" is a member of the group consisting of hydrogen, lower alkyl and lower alkenyl groups, containing up to 4 carbon atoms, said pyrrolidone compounds including 2-pyrrolidone, N-methyl-, N-ethyl-, N-isopropyl-, N-butyl- and N-vinyl-2-pyrrolidone.

The quantity of such pyrrolidone compounds employed for a given amount of pigment should be at least sufficient to form a non-breaking paste (as attained in the standard rub-out test, commonly applied to determine pigment oil absorption). Quantities of pyrrolidone compound used in excess of the aforesaid minimum are not critical, but for purposes of convenience and economy, the amounts employed advantageously range up to four (4) times the weight of the pigment, and are preferably from 1 to 3 parts per part by weight of pigment.

The resulting pastes, consisting essentially of a mixture of pigment with the pyrrolidine compound, require no grinding but when merely stirred form a uniform paste suitable for direct incorporation in coating compositions of the nature above indicated.

Film-forming coating compositions suitable for incorporation of the pigment pastes of the present invention are, for example, spirit lacquers, varnishes, drying oils, cellulose nitrate or cellulose acetate lacquers, litho varnish for printing inks, aqueous emulsions of natural or artificial latex, or aqueous solutions containing water-soluble binders (glue, casein, methylcellulose, polyvinyl alcohol, carboxymethylcellulose and the like) used in water paints. Incorporation of the pigment pastes is effected merely by adding the paste to the coating composition and stirring until the mixture is uniform. Alternatively, the paste of pigment and pyrrolidone compound can first be diluted with a solvent compatible with the coating composition, and the resulting slurry stirred into the coating composition.

The resulting pigmented coating compositions, when prepared in accordance with this invention, show color strength similar to that obtained hitherto from pigments which have been ground with the coating composition or its components in a ball mill or on a three roller mill for long periods.

The invention will be more readily understood from the following examples wherein parts, proportions and percentages are by weight unless otherwise indicated.

*Example I*

Two parts of pigment carmine prepared by coupling diazotized o-anisidine-5-sulfondiethylamid with 2-hydroxy-3-naphthoic acid-5'-chloro-2',4'-dimethoxyanilide were mixed by stirring with 3 parts of N-vinyl-2-pyrrolidone until a substantially uniform mixture was obtained. This mixture was added to 100 parts of nitrocellulose lacquer having the following composition:

27 parts RS nitrocellulose ½ sec.
12.4 parts glycerol-phthalate alkyd resin
14.5 parts ethanol
9.5 parts butanol
15.7 parts ethyl acetate
6.5 parts butyl acetate
6.6 parts xylol
7.7 parts di-butyl phthalate The mixture was stirred until uniform, and the resulting lacquer was coated on aluminum foil and allowed to dry. The coating yielded a brilliant carmine shade substantially free from visible specks.

As a control, two parts of the same pigment were similarly mixed directly with 100 parts of the same lacquer, and the mixture was similarly coated on aluminum foil. The resultant coating was a very light pink, and showed numerous visible specks.

*Example II*

A mixture of 25 parts of copper phthalocyanine blue were mixed with 75 parts of N-vinyl-2-pyrrolidone, and the mixture stirred until substantially uniform. 5 parts of the resulting mixture were added to 100 parts of the nitrocellulose lacquer described in Example I, and after shaking until uniformly mixed, the lacquer was coated on aluminum foil. A brilliant blue shade showing no specks and full color strength was obtained.

Similar results were obtained using copper phthalocyanine pigment which had been pretreated to reduce crystallizing tendencies, the proportion of pigment to N-vinyl-2-pyrrolidone being, in this case, 35 to 65 rather than 25 to 75.

Similarly, a brilliant green coating was produced on aluminum foil upon substituting, for copper phthalocyanine blue, of this example, chlorinated copper phthalocyanine green containing about 15 atoms of chlorine per molecule—the ratio of pigment to pyrollidone compound being, in this case, 40:60.

*Example III*

A series of pigments were mixed with N-vinyl pyrrolidone in accordance with the invention to form pastes suitable for incorporation in nitrocellulose and vinyl resin lacquers. The pigments were as follows:

(1) Yellow condensation products of 2-hydroxynaphthaldehyde with hydrazine
(2) Yellow monazo pigment from coupling diazotized p-chloro-o-nitraniline with acetoacet-o-chloroanilide
(3) Lemon ochre (ferric oxide)
(4) Pigment Orange (lead chromate molybdate)
(5) Orange disazo pigment from coupling tetraazotized 2,2'-dichlorobenzidine with 1-phenyl-3-methyl-pyraxolone-5
(6) Red barium lake of azo dye from coupling diazotized m-toluidine-sulfoacid with beta-naphthol
(7) Red pigment from coupling diazotized 2-amino-3-chloroanthraquinone with 2-hydro-2-naphthoic acid-o-anisidide
(8) Red calcium lake of azo dye from coupling diazotized 6-amino-4-chloro-m-toluenesulfo acid with 2-hydroxy-3-naphthoic acid
(9) Red azo pigment from coupling diazotized 5-chloro-o-anisidine with 2-hydroxy-3-naphthoicacid-m-nitranilide
(10) The carmine azo pigment of Example I
(11) Red azo pigment from coupling tetrazotized dianisidine with 1-phenyl-3-methyl-pyrazolone-5
(12) Copper phthalocyanine blue (of Example II)
(13) Chlorinated copper phthalocyanine green (of Example II)

These pigments were mixed with N-vinyl-2-pyrrolidone in proportions ranging from one to three parts by weight of pyrrolidone compound per part by weight of pigment, as follows:

| Pigment | Ratio—Pigment: Pyrrolidone compound |
|---|---|
| No. (1) | 25:75 |
| No. (2) | 25:75 |
| No. (3) | 25:75 |
| No. (4) | 50:50 |
| No. (5) | 25:75 |
| No. (6) | 37:63 |
| No. (7) | 25:75 |
| No. (8) | 25:75 |
| No. (9) | 25:75 |
| No. (10) | 25:75 |
| No. (11) | 25:75 |
| No. (12) | 35:65 |
| No. (13) | 35:65 |

The pastes were stirred until substantially uniform, allowed to stand for 57 days, examined, and then allowed to stand for an additional 63 days and again examined for separation and crystallization. With the exception of pigments (1) and (2) which showed distinct separation, at most slight separation occurred. With the exception of pigment (2) which exhibited some crystallization after 120 days, the pigments remained non-crystalline. All of the pastes remained suitable for incorporation in coating compositions, e.g., in the nitrocellulose and vinyl resin lacquers of Examples IV and V.

Upon substituting 2-pyrrolidone or N-methyl-2-pyrrolidone for the N-vinyl-2-pyrrolidone of this example, pigment-pastes similar properties are obtained.

*Example IV*

In order to prepare nitrocellulose lacquers from the pigment-pyrrolidone compositions of Example III, the pastes were first diluted with a solvent having the following composition:

40 parts methanol
27 parts ethanol
18 parts toluene
15 parts ethylacetate

For each pigment, one part paste was diluted with 20 parts solvent and in the case of pigment (10), 0.5 part and 2 parts paste were also diluted with 20 parts solvent. The resulting diluted pigment pastes were then added in each case to 40 parts of nitrocellulose lacquer having the composition set out in Example I. The resulting pigmented lacquers were shaken until substantially uniform and then coated on aluminum foil. Additional aluminum foil coatings were made after 57 days, and again after a further period of 63 days. At the end of these intervals, the lacquer samples were examined for thickening and crystallization. In each case, the mixtures remained thin or very thin, and were readily pourable, and the pigments remained uncrystallized. As compared with the shades produced initially, the colorations were in each case at least equal and generally stronger after the lacquer had been allowed to stand for periods up to 120 days. Such pigment separation as occurred was not excessive. Full color yield was produced despite absence of any grinding operation with the lacquer or its components.

Similar results are obtained upon using N-methyl-2-pyrrolidone pastes or 2-pyrrolidone pastes of Example III in preparing the nitrocellulose lacquers of this example.

*Example V*

A series of pigmented vinyl lacquers from the pigment vinyl-pyrrolidone pastes of Example III by first diluting one part of each paste with 16 parts of a solvent consisting of equal parts by weight of toluene and of methylethylketone, and then adding the diluted mixture to 40 parts of a vinyl lacquer having the following composition:

30 parts vinylchloride-vinylacetate copolymer
40 parts methylisobutylketone
20 parts methyl-n-amylketone
40 parts toluene After mixing the pigment with the lacquers by shaking until uniformly distributed, the pigmented lacquers were coated on aluminum foil. Similar coatings were made from the same lacquers after standing for successive periods of 57 and 63 days, respectively. In addition, the lacquer samples were examined at the end of said intervals for separation and crystallization. Except for formation of some crystals in the case of pigment (1) at the end of the second interval, no crystallization occurred. In all cases where coatings were made the coloration produced after the lacquer had been aged increased in intensity or remained equal to the coloration initially produced. As in the preceding example, full color yield was obtained. When the 2-pyrrolidone pastes or N-methyl-2-pyrrolidone pastes of Example III are substituted in this example for the N-vinyl-2-pyrrolidone pastes, similar results are obtained. However, the lacquers obtained with 2-pyrrolidone or N-methyl-2-pyrrolidone have somewhat less tendency to thicken on standing for long periods as compared with lacquers containing N-vinyl pyrrolidone.

The quantity of pyrrolidone compound contained in the pastes incorporated in the coating compositions illustrated in the foregoing examples may vary over a substantial range. In general, however, the amount of pyrrolidone compound thus incorporated should not substantially exceed 10% by weight of the non-volatile film-forming components of the coating compositions. The pyrrolidone compounds employed according to this invention, are high-boiling liquids which remain in the film formed by the coating composition on drying, and serve as plasticizers for the water-soluble binders or organic non-aqueous film forming components, yielding a continuous film on drying.

Instead of the nitrocellulose lacquer or vinyl resin lacquer of the examples, other organic lacquers or varnishes can be used in the same manner. Similarly, drying oil varnishes, litho varnish phenolic and alkyd resin-modified varnishes, alkyd solvent type paints, and varnishes can be used in the same manner. Similarly, dry- are suitable.

Further, the pigment-pyrrolidone compound pastes can be incorporated in aqueous latex emulsions of natural rubber or of synthetic resins. Preliminary dilution of the pastes can be effected in this case with water.

Since the pyrrolidone compounds are miscible with water, the pigment pastes of the invention can also be incorporated in aqueous coating composition media containing water-soluble binders, e.g., in water paints, the binders being for example, glue, gelatin, casein, carboxymethylcellulose, polyvinyl alcohol and the like. The pyrrolidone compounds are also compatible with binders of this type.

In each case, pretreatment of the dry pigment with the pyrrolidone compound insures full color strength without the necessity of subjecting it to a grinding treatment on a three roller mill or in a ball mill commonly used in incorporating pigments in paints or lacquers.

The pigment pastes of this invention can also be mixed with coating compositions which already contain a pigment dispersed therein, the pigment being effective in this case to shade other pigments already present.

Variations and modifications which will be obvious to those skilled in the art can be made in the compositions and processes hereinabove described and illustrated, without departing from the scope of the invention.

I claim:
1. A composition of matter consisting of a pigment in admixture with a paste-forming amount of a pyrrolidone compound having the formula

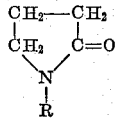

wherein "R" represents a member of the group consisting of hydrogen, lower alkyl and lower alkenyl hydrocarbon radicals of 1 to 4 carbon atoms.

2. A composition of matter as defined in claim 1 wherein the quantity of pyrrolidone compound per part of pigment, is 1 to 3 parts by weight.

3. A composition as defined in claim 1 wherein said pyrrolidone compound is N-vinyl-2-pyrrolidone.

4. A composition as defined in claim 1 wherein said pyrrolidone compound is N-methyl-2-pyrrolidone.

5. A composition as defined in claim 1 wherein said pyrrolidone compound is 2-pyrrolidone.

6. A liquid coating composition for protective and decorative use, comprising a liquid film-forming coating composition vehicle, a pigment and a pyrrolidone compound having the formula

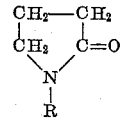

wherein "R" represents a member of the group consisting of hydrogen, lower alkyl and lower alkenyl hydrocarbon radicals of 1 to 4 carbon atoms, the quantity of said pyrrolidone compound ranging up to 10% by weight of the other non-volatile components exclusive of pigments.

7. A coating composition as defined in claim 6 wherein said coating composition vehicle is a nitrocellulose lacquer, and the proportion of pigment to said pyrrolidone compound is from 1:1 to 1:3.

8. A composition as defined in claim 6 wherein said coating composition is a vinyl chloride-vinylacetate copolymer lacquer, and the proportion of pigment to said pyrrolidone compound is from 1:1 to 1:3.

References Cited in the file of this patent

UNITED STATES PATENTS

| | | |
|---|---|---|
| 2,918,443 | Roeser | Dec. 22, 1959 |
| 2,941,970 | Craig | June 21, 1960 |

FOREIGN PATENTS

| | | |
|---|---|---|
| 603,873 | Great Britain | June 24, 1948 |
| 520,406 | Canada | Jan. 3, 1956 |

UNITED STATES PATENT OFFICE
CERTIFICATE OF CORRECTION

Patent No. 3,166,429                        January 19, 1965

Emil A. Wich

It is hereby certified that error appears in the above numbered patent requiring correction and that the said Letters Patent should read as corrected below.

Column 5, line 10, for "nishes can be used in the same manner. Similarly, dry-" read -- nishes or lacquers from other natural or synthetic resins --.

Signed and sealed this 16th day of November 1965.

(SEAL)
Attest:

ERNEST W. SWIDER                        EDWARD J. BRENNER
Attesting Officer                          Commissioner of Patents